Patented Dec. 1, 1942

2,303,348

UNITED STATES PATENT OFFICE 2,303,348

METHOD FOR MODIFYING ORGANIC BODIES TO RAISE THE TRANSITION TEMPERATURE THEREIN FROM NONFLUID TO FLUID PHASE AND THE COMPOSITION

Michael W. Freeman and Joseph J. Katz, Detroit, Mich.; said Katz assignor to said Freeman No Drawing. Application December 6, 1937, Serial No. 178,416

9 Claims. (Cl. 252—302)

It is the object of the invention to obtain a simple means of modifying various organic bodies so as to raise the temperature of transition therein from non-fluid to fluid phase and without detrimentally affecting their desirable characteristics. As a specific example a lubricating oil which is fluid at normal temperature may be so modified as to remain non-fluid or plastic at such temperature or even one considerably higher, while still retaining all of its lubricating properties.

Heretofore, various means have been employed in different arts in an effort to attain such results. Most of the methods employed are highly specific for each particular field and are not capable of wide application. Also, these methods are not very satisfactory. For instance, lubricants have been solidified by incorporating therein alkali metal or heavy metal soaps. Such combinations have serious shortcomings, particularly in the tendency of the oil to separate from the incorporated soap, leaving a residue of soap curds having no lubricating value. Also, there is a tendency for the oil to separate in the container, upon storage.

With the present invention, the modifying means is generally applicable to a large variety of organic bodies and while the means employed in different specific applications is somewhat varied all belong to the same general type. Furthermore, the modified products are relatively more homogeneous and the tendency toward separation is reduced to a minimum. Another desirable characteristic is that starting with the same base ingredients a variety of organic bodies may be modified by merely varying the proportions of the ingredients used, or the same organic body may be modified to yield a series of products by varying the proportions of the ingredients used. Thus, products varying in consistency from that of a thin jelly to that of a hard firm substance, such as can be molded and will resist deformation, can be prepared by combinations of the same ingredients in varying proportions. Likewise, the properties of given combinations can be varied by utilizing members of homologous series. Another advantage of our invention is that some organic liquids may be so modified as to form solids which will retain their shape. Thus, such material when melted can be cast into molds to fashion it to any desired form.

Generally described, our improved modifying agent comprises an organic nitrogen base-organic acid reaction product, and an organic sulphonate, each being in some degree miscible with the organic body to be treated, and also with water. By the term "organic nitrogen base-organic acid reaction product," we mean to include: (1) amine organic acid reaction products and (2) quaternary ammonium hydroxide organic acid reaction products. As representative of class (1) are the following: a reaction product prepared from alkyl amines, alkyl polyamines, alkylol amines, polyalkylene polyamines, alicyclic amines, aralkylamines, hetrocyclic basic nitrogen compounds, etc. As representative of class (2) are: tetralkyl ammonium hydroxides and aryl-aralkyl ammonium hydroxides, etc., with various organic acids. These acids may be mono or poly carboxylic acids of the aliphatic and aromatic series; also, organic sulphonic acids, such as p-toluene sulphonic acid, paradiphenylsulphonic acid, etc. However, the carboxylic acids are generally more satisfactory.

More specifically, we have found such amines as diethylamine, mono-amylamine, di-amylamine and tri-amylamine, di-n-butylamine, monobutylamine, di-butylamines, mono-ethanolamine, di-ethanolamine, tri-ethanolamine, di-aminoisopropanol, ethylene diamine, triethylene tetramine, cyclohexylamine dicyclohexylamine, benzylamine, morpholine, trimethyl benzyl ammonium hydroxide, dimethyl-dibenzyl ammonium hydroxide, tetraethyl ammonium hydroxide, etc., to be suitable. Among the acids which have been found suitable are stearic, oleic palmitic, ricinoleic, linoleic, sebacic, benzoic, peanut-oil fatty acids, soy bean oil fatty acids, hydrogenated soy bean oil fatty acids, hydrogenated fish oil fatty acids, naphthenic acid, acids prepared by oxidation petroleum hydrocarbons, abietic acid, etc. The acid and the amine must be so chosen that the resultant product is relatively miscible in the organic body being modified and also miscible to some degree in water. As an example, triamylamine stearate is one of the least readily emulsifiable in water and despite its solubility in hydrocarbon oils it is not as satisfactory for the modification of such oils as other amine carboxylic acid reaction products which are more readily emulsifiable in water. We have found such compounds as diethylamine oleate, diethylamine stearate, diethylamine ricinoleate, diethylamine benzoate, the ethanolamine stearates, oleates, ricinoleates, benzoates, the amylamine stearates, oleates, ricinoleates, benzoates, linoleates; di-n-butyl amine oleate, stearate, sebacate, benzoate linoleate, butyrate, acetate; diamino isopropanol amine stearate, oleate, linoleate; triethylenetetramine oleate, stearate; cyclohexylamine oleate and stearate; dicyclohexylamine stearate, linoleate and oleate; benzylamine stearate, oleate, linoleate, benzoate, acetate; morpholine stearate, oleate, naphthenate; etc., to be satisfactory for the purpose. Since there are a vast number of amine carboxylic acid reaction products available it is obviously impossible to enumerate them all. However, we have found those reaction products which combine relative miscibility with the organic body being modified and which at the same time are emulsifiable in water, to be the most satisfactory for the purpose. Whether or not a given organic nitrogen base-organic acid reaction product will be suitable can easily be determined in the light of the above criterion. The exact nature of the reaction is not fully understood, but there seems to be a co-relation between the basicity of this material and its emulsifiability in water. It has been observed that in general the more strongly basic amines usually form reaction products which are more readily emulsifiable in water. Thus, morpholine stearate is emulsifiable in water, whereas other weaker hetrocyclic bases, i. e., pyridine and quinoline, do not yield stearates which are emulsifiable. Morpholine stearates are, therefore, much more suitable for the purpose than pyridine and quinoline stearates. In general, it appears that those organic bases which have sufficient basicity to form, at least in part, water-miscible products with organic acids, are most suitable. The acid must also be chosen so that the amine acid reaction product conforms with the criterion established above, viz: that the reaction product be somewhat miscible with both water and the organic body being modified.

The term organic sulphonate is meant to include those organic sulphonates or closely related compounds (such as alkyl sulphuric acid esters), which are appreciably miscible with the organic body being modified, and at the same time capable of functioning as surface active compounds in aqueous solution. Among these are such compounds as the esters of sulpho-dicarboxylic acids, polyalkylated naphthalene sulphonates, polyalkylated naphthalene sulphonate-formaldehyde condensation products, polyalkylated diphenyl sulphonates, higher alkyl sulfated alcohols, higher sulfated secondary alcohols, sulphonated caster oil, sodium taurocholate, etc., which are typical of compounds which may be used for the purpose. A common property of these diversified materials is that they are capillary-active in aqueous solution; that is, they function as surface active compounds; they depress the surface tension of their aqueous solutions; they possess foaming powers; and in general manifest the characteristics common to capillary-active colloidal electrolytes. Furthermore, all of these compounds are characterized by the fact that in aqueous solution the capillary-active properties are associated with the presence of negatively charged colloidal micelles. We have found that compounds of this class, viz: colloidal electrolytes which are at least moderately miscible in the organic body being modified, are satisfactory for the purpose. However, since the number of colloidal electrolytes already known is very large, it is obviously impossible to enumerate all. More specifically, the following compounds have been found satisfactory, the esters of sulpho-succinic acid known commercially as "Aerosol" "OT," "AY," "MA," sulphated higher primary alcohols, such as "Gardinols," "Avirols" and "Duponols," sulphated higher secondary alcohols known commercially as the "Tergitols"; a formaldehyde condensation product of di-isopropylated naphthalene beta sulphonic acid; sodium taurocholate, sulphonated castor oil; those petroleum sulphonic acids which are miscible with both oil and water; di-secondary butyl naphthalene sulphonate, sodium tetrahydro naphthalene beta sulphonate, etc.

While we generally employ alkali metal salts since they are more readily available, other salts either preformed or formed in situ are satisfactory, provided they possess the above described properties.

To summarize, an organic body may be modified so as to raise the temperature of transition from non-fluid to fluid phase as follows. Add to said organic body a reaction product of an organic nitrogen base-organic acid so chosen that the said product is relatively miscible in the organic body and at the same time miscible, at least in part, with water; in conjunction with a colloidal electrolyte which is capillary active in aqueous solution and which is at the same time appreciably miscible with the organic body. When both of these ingredients are present in the organic body, it will be found that the transition temperature of said body from non-fluid to fluid phase will be raised. Both must form colloidal solutions in both water and the organic body being modified, and their effectiveness is reduced the more they approach a condition of true solubility in either water or the organic body. The degree of colloidality of these materials is not a fixed constant property, but depends not only upon the structure of the compound in question, but also on the medium in which it is placed. Thus, a material may be in a state of colloidal dispersion in a hydrocarbon, but be in true solution in a material such as monoethyl ether of ethylene glycol. Whether or not a material exists in colloidal solution or in true solution is apparent to one versed in the art.

Some of the organic bodies which we have modified are glycerine, ethylene dichloride, trichlorodiphenyloxide, cod-liver oil, castor oil, hydrocarbon oils of various viscosities, aniline, paraffin wax, etc. The effectiveness of the modifying agent is apparently roughly proportional to the dielectric constant of the organic body employed. It appears that the lower the dielectric constant of the organic body, the smaller the quantity of added ingredients are necessary to achieve a given result. It will be understood that this modifying process cannot be applied to organic bodies which are so highly reactive with either of the added materials as to change them radically.

The amount of the modifying ingredients will in general be determined by the nature of the original organic body to be modified and also by the characteristics which it is desired to obtain. It is not possible to establish universal definite proportions, but the proper proportion of materials used in each instance can be readily determined.

The nature of the initial material and the desired final characteristics will in all cases determine the amount and type of organic nitrogen base-organic acid reaction product and organic sulphonate to be employed. Thus, if it is desired to prepare a material with a decreased resistance to removal by water, it is desirable to employ those amine acid reaction products which are most readily emulsifiable in water, particularly such as are prepared by the interaction of strongly basic amines and the higher aliphatic carboxylic fatty acids. The use of amine acid reaction products prepared from the higher saturated aliphatic carboxylic acids (palm-oil fatty acids, stearic acid) yield products which are, in the case of organic liquids, hard and firm without much resiliency. The use of the higher unsaturated fatty acids (prepared from oleic, linoleic, ricinoleic acids) yield products which have a high degree of resiliency. Those amine acid products which are prepared from aromatic carboxylic acids, such as benzoic acid, yield in those cases where the organic body being modified is liquid hydrocarbon pasty masses which do not become freely fluid even at elevated temperatures. Similarly, amine acid reaction products which are prepared from the lower aliphatic saturated fatty acids (glacial acetic, butyric acids) also yield pasty masses with organic liquids. In general, to prepare hard products from organic liquids, the higher fatty acids will be found to be more suitable than the lower members.

To achieve intermediate properties, mixtures of amines and mixtures of acids may be employed. We have found that in certain cases, it is desirable to have an excess of amine present in the final product because of its value in counteracting the effect of corrosive materials, such as acidic gases, particularly when the modifying organic body is being used in conjunction with metal parts, and in other cases serves as a stabilizer.

As ordinarily prepared, our new products are substantially anhydrous, other than the moisture normally present in the various ingredients, which usually is low. We have found the additions of relatively low percentages of water, particularly in amounts smaller than those required to inhibit gelation (in the case of organic liquids) to possess certain advantages. The materials are improved in appearance and the transparency increased, of course within the limitations of the original starting materials employed. The modified products prepared from amine oleate reaction products are more susceptible to the presence of water than those products prepared from the saturated higher fatty acids. Thus, such products will tolerate much smaller percentages of water without the destruction of their jell structure. The optimum quantity of water can readily be determined by simple trial.

While we have described our improved product as used for treating various organic bodies, it may also be useful for other purposes. Thus the transition temperature from non-fluid to fluid phase in the composition will be higher than that of each of the ingredients, so that this composition of itself may be useful for certain purposes.

The materials may be commingled with the organic body to be modified in any suitable way which will result in a homogeneous mixture. However, on some occasions it may be desirable to heat the organic body to facilitate such commingling. The materials may be added in any order and even the individual constituents thereof may be separately added. Such products as normally set to a solid state may be rendered plastic by stirring.

The following are some specific formulas for organic bodies and their modifying agents:

HYDROCARBON OILS

Example 1

| | Parts |
|---|---|
| 750 sec. pale oil | 170 |
| Diethylamine stearate | 15 |
| Mahogany soap | 15 |

This is a firm jell at 75° C.

Example 2

| | Parts |
|---|---|
| 750 sec. pale oil | 170 |
| Diethylamine stearate | 15 |
| Mahogany soap | 15 |
| Water | 5 |

This is a jell similar to the one above, except that it is appreciably firmer at room temperature. It is also more transparent, and does not become fluid even at 70° C.

Example 3

| | Parts |
|---|---|
| 750 sec. pale oil | 170 |
| Diethylamine stearate | 15 |
| Mahogany soap | 15 |
| Glycerine | 5 |

This has the same properties as Example 2 with the additional characteristic that there will be no loss by evaporation as might be the case with water. Other polyhydroxyl compounds may also be substituted for the water.

Example 4

| | Parts |
|---|---|
| 3000 sec. Pennsylvania cylinder stock | 300 |
| Diamyl stearate | 30 |
| Mahogany soap | 30 |

This is a very firm jell. It sets at about 65° C.

Example 5

| | Parts |
|---|---|
| 750 sec. pale oil | 180 |
| Diamylamine stearate | 10 |
| Mahogany soap | 10 |

This is a solid jell. By the A. S. T. M. drop point method it shows a drop point of 145° F.

Example 6

| | Parts |
|---|---|
| 200 sec. pale oil | 180 |
| Diamyl oleate | 10 |
| Mahogany soap | 10 |

This is a firm rubbery jell. It is transparent and sets at about 55° C.

Example 7

| | Parts |
|---|---|
| 750 sec. pale oil | 80 |
| Dibutylamine benzoate | 10 |
| Mahogany soap | 10 |

This forms a pasty mass. It does not become fluid even at 140° C.

Example 8

| | Parts |
|---|---|
| 750 sec. pale oil | 170 |
| Diethylamine oleate | 15 |
| Ester of sulpho-succinic acid | 15 |

This yields a firm resilient jell which jells at 80° C. It is transparent.

Example 9

| | Parts |
|---|---|
| 750 sec. pale oil | 85 |
| Sodium di-isopropyl napthalene sulphonate | 7.5 |
| Cyclohexyl amine stearate | 7.5 |

Example 10

| | Parts |
|---|---|
| 750 sec. pale oil | 94 |
| Ester of sulpho-succinic acid | 5 |
| Triethanolamine oleate | 1 |

This is a firm jell, which is transparent, and sets at about 55° C.

Example 11

| | Parts |
|---|---|
| Refined medicinal mineral oil | 100 |
| Diamyl stearate | 2.5 |
| Ester of sulpho-succinic acid | 5 |

This a clear transparent jell, very suitable for a cosmetic base.

Example 12

| | Parts |
|---|---|
| 550 sec. pale oil | 80 |
| Mahogany soap | 15 |
| Benzylamine linoleate | 5 |

This is a rubbery jell.

Example 13

| | Parts |
|---|---|
| 550 sec. pale oil | 180 |
| Diaminoisopropanol oleate | 15 |
| Mahogany soap | 5 |

This is a firm jell with a drop point of approximately 160° F.

Example 14

| | Parts |
|---|---|
| 750 sec. pale oil | 30 |
| Di-n-butylamine p-toluene sulphonate | 30 |
| Mahogany sulphonate | 30 |

This is a viscous pasty mass.

Example 15

| | Parts |
|---|---|
| 200 sec. pale oil | 50 |
| Diamylamine stearate | 10 |
| Sodium dibutyl diphenyl sulphonate | 5 |

This is a jell.

Other Modified Organic Bodies

Example 16

| | Parts |
|---|---|
| Glycerine | 85 |
| Diamylamine stearate | 7.5 |
| "Aerosol" OT | 7.5 |

This is a firm jell.

Example 17

| | Parts |
|---|---|
| Glycerine | 42.5 |
| Triethylenetetramine stearate | 5 |
| Sodium di-isopropyl naphthalene sulphonate | 10 |

This is a jell.

Example 18

| | Parts |
|---|---|
| Cod-liver oil | 25 |
| Sulphonated castor-oil | 10 |
| Di-n-butylamine benzoate | 5 |
| Di-n-butylamine stearate | 5 |
| Diamylamine stearate | 5 |

This is salve-like material suitable for use as an ointment.

Example 19

| | Parts |
|---|---|
| Glycerine | 40 |
| "Aerosol" OT | 7.5 |
| Cyclohexylamine oleate | 2.5 |
| Diamylamine stearate | 7.5 |

This forms a stiff paste.

Example 20

| | Parts |
|---|---|
| Paraffin wax M. P. 137° F | 40 |
| Mahogany soap | 4.5 |
| Monoethanolamine stearate | 10 |

Whereas this material is fluid at 140° F. by itself, when the additions are made as indicated, the material will be solid at 160° F., sufficiently so as to be cuttable with a knife.

Example 21

| | Parts |
|---|---|
| Oil | 37.5 |
| Mahogany soap | 6.5 |
| Trimethyl benzyl ammonium hydroxide (40% solution) | 4.0 |
| Stearic acid | 2.5 |

This forms a very firm jell.

Example 22

| | Parts |
|---|---|
| Trimethyl benzyl ammonium stearate | 5.0 |
| Mahgony soap | 5.0 |
| Oil | 90.0 |

This forms a jell.

Example 23

| | Parts |
|---|---|
| Trimethyl benzyl ammonium hydroxide | 5.0 |
| Ester of sulpho-succinic acid | 5.0 |
| Oil | 90.0 |

This forms a clear firm transparent jell.

Example 24

| | Parts |
|---|---|
| Oil | 85.0 |
| Ester of sulpho-succinic acid | 10.0 |
| Trimethyl benzyl ammonium stearate | 5.0 |

This forms a jell.

Example 25

| | Parts |
|---|---|
| Oil | 85.0 |
| Ester of sulpho-succinic acid | 10.0 |
| Trimethyl benzyl ammonium oleate | 5.0 |

This forms a jell.

Example 26

| | Parts |
|---|---|
| Monoethyl ether of ethylene glycol | 80 |
| Mahogany soap | 10 |
| Tetraethyl ammonium stearate | 10 |

Example 27

| | Parts |
|---|---|
| Alcohol—ethyl | 80 |
| Ester of sulpho-succinic acid | 10 |
| Dimethyl dibenzene ammonium stearate | 10 |

This forms a solid jell.

What we claim as our invention is:

1. In a method of raising the transition temperature from the substantially non-fluid to the fluid phase in organic bodies capable of passing from one of said phases to the other without chemical change, the step of adding to the said organic body an agent consisting of an organic capillary-active colloidal sulphonate and the reaction product of an organic nitrogen base and an organic mono-carboxylic acid having more than four carbons, said organic nitrogen base being of the class consisting of alkyl amines, alkyl polyamines, polyalkylene polyamines, alicyclic amines, aralkylamines, heterocyclic basic nitrogen compound, tetralkyl ammonium hydroxides, alkyl-aralkyl ammonium hydroxides, said organic sulphonate and said reaction product each being substantially chemically non-reactive with the said organic body and to some degree miscible therewith and with water.

2. In a method of raising the transition temperature from the substantially non-fluid to the fluid phase in organic bodies capable of passing from one of said phases to the other without chemical change, the step of adding to the said organic body an agent consisting of an organic capillary-active colloidal sulphonate and the reaction product of an organic nitrogen base and said organic acid being of the class consisting of stearic, oleic palmitic, ricinoleic, linoleic, sebacic, benzoic, peanut-oil fatty acids, soy bean oil fatty acids, hydrogenated soy bean oil fatty acids, hydrogenated fish oil fatty acids, naphthenic acid, acids prepared by oxidation petroleum hydrocarbons, abietic acid, said organic nitrogen base being of the class consisting of alkyl amines, alkyl polyamines, polyalkylene polyamines, alicyclic amines, aralkylamines, heterocyclic basic nitrogen compound, tetralkyl ammonium hydroxides, alkyl-aralkyl ammonium hydroxides, said organic sulphonate and said reaction product each being substantially chemically non-reactive with the said organic body and to some degree miscible therewith and with water.

3. In a method of raising the transition temperature from the substantially non-fluid to the fluid phase in organic bodies capable of passing from one of said phases to the other without chemical change, the step of adding to the said organic body an agent consisting of an organic capillary-active colloidal sulphonate of the class consisting of alkyl sulphuric acid esters, esters of sulpho-dicarboxylic acids, polyalkylated naphthalene sulphonates, polyalkylated naphthalene sulphonate-formaldehyde condensation products, polyalkylated diphenyl sulphonates, higher alkyl sulfated alcohols, higher sulfated secondary alcohols, sulphonated castor oil, sodium taurocholate, sulphated higher primary alcohols, formaldehyde condensation product of di-isopropylated naphthalene beta sulphonate, petroleum sulphonates, di-secondary butyl naphthalene sulphonate, sodium tetrahydro naphthalene beta sulphonate and the reaction product of an organic nitrogen base and an organic mono-carboxylic acid having more than four carbons, said organic nitrogen base being of the class consisting of alkyl amines, alkyl polyamines, polyalkylene polyamines, alicyclic amines, aralkylamines, heterocyclic basic nitrogen compound, tetralkyl ammonium hydroxides, alkyl-aralkyl ammonium hydroxides, said organic sulphonate and said reaction product each being substantially chemically non-reactive with the said organic body and to some degree miscible therewith and with water.

4. A composition of matter consisting of an organic body capable of passing from a substantially non-fluid to a fluid phase without chemical change, and an agent for raising the transition temperature of said body from a substantially non-fluid to a fluid phase, said agent consisting of an organic capillary-active colloidal sulphonate and the reaction product of an organic nitrogen base and an organic mono-carboxylic acid having more than four carbons, said organic nitrogen base being of the class consisting of alkyl amines, alkyl polyamines, polyalkylene polyamines, alicyclic amines, aralkylamines, heterocyclic basic nitrogen compound, tetralkyl ammonium hydroxides, alkyl-aralkyl ammonium hydroxides, said organic sulphonate and said reaction product each being substantially chemically non-reactive with the said organic body and to some degree miscible therewith and with water.

5. A composition of matter consisting of an organic body capable of passing from a substantially non-fluid to a fluid phase without chemical change, and an agent for raising the transition temperature of said body from a substantially non-fluid to a fluid phase, said agent consisting of an organic capillary-active colloidal sulphonate and the reaction product of an organic nitrogen base and said organic acid being of the class consisting of stearic, oleic palmitic, ricinoleic, linoleic, sebacic, benzoic, peanut-oil fatty acids, soy bean oil fatty acids, hydrogenated soy bean oil fatty acids, hydrogenated fish oil fatty acids, naphthenic acid, acids prepared by oxidation petroleum hydrocarbons, abietic acid, said organic nitrogen base being of the class consisting of alkyl amines, alkyl polyamines, polyalkylene polyamines, alicyclic amines, aralkylamines, heterocyclic basic nitrogen compound, tetralkyl ammonium hydroxides, alkyl-aralkyl ammonium hydroxides, said organic sulphonate and said reaction product each being substantially chemically non-reactive with the said organic body and to some degree miscible therewith and with water.

6. A composition of matter consisting of an organic body capable of passing from a substantially non-fluid to a fluid phase without chemical change, and an agent for raising the transition temperature of said body from a substantially non-fluid to a fluid phase, said agent consisting of an organic capillary-active colloidal sulphonate of the class consisting of alkyl sulphuric acid esters, esters of sulpho-dicarboxylic acids, polyalkylated naphthalene sulphonates, polyalkylated naphthalene sulphonate-formaldehyde condensation products, polyalkylated diphenyl sulphonates, higher alkyl sulfated alcohols, higher sulfated secondary alcohols, sulphonated castor oil, sodium taurocholate, sulphated higher primary alcohols, formaldehyde condensation product of di-isopropylated naphthalene beta sulphonate, petroleum sulphonates, di-secondary butyl naphthalene sulphonate, sodium tetrahydro naphthalene beta sulphonate and the reaction product of an organic nitrogen base and an organic mono-carboxylic acid having more than four carbons, said organic nitrogen base being of the class consisting of alkyl amines, alkyl polyamines, polyalkylene polyamines, alicyclic amines, aralkylamines, heterocyclic basic nitrogen compound, tetralkyl ammonium hydroxides, alkyl-aralkyl ammonium hydroxides, said organic sulphonate and said reaction product each being substantially chemically non-reactive with the said organic body and to some degree miscible therewith and with water.

7. A composition of matter consisting of an organic body capable of passing from a substantially non-fluid to a fluid phase without chemical change, and an agent for raising the transition temperature of said body from a substantially non-fluid to a fluid phase, said agent consisting of alkyl amine benzoate, and an organic capillary active colloidal sulphonate, each being substantially chemical non-reactive with said organic body and to some degree miscible therewith and with water.

8. A composition of matter consisting of an organic body capable of passing from a substantially non-fluid to a fluid phase without chemical change, and an agent for raising the transition temperature of said body from a substantially non-fluid to a fluid phase, said agent consisting of alkyl amine stearate, and an organic capillary active colloidal sulphonate, each being substantially chemically non-reactive with said organic body and to some degree miscible therewith and with water.

9. A composition of matter consisting of an organic body capable of passing from a substantially non-fluid to a fluid phase without chemical change, and an agent for raising the transition temperature of said body from a substantially non-fluid to a fluid phase, said agent consisting of alkyl amine oleate and an organic capillary active colloidal sulphonate, each being substantially chemically non-reactive with said organic body and in some degree miscible therewith and with water.

MICHAEL W. FREEMAN.
JOSEPH J. KATZ.